Patented May 16, 1939

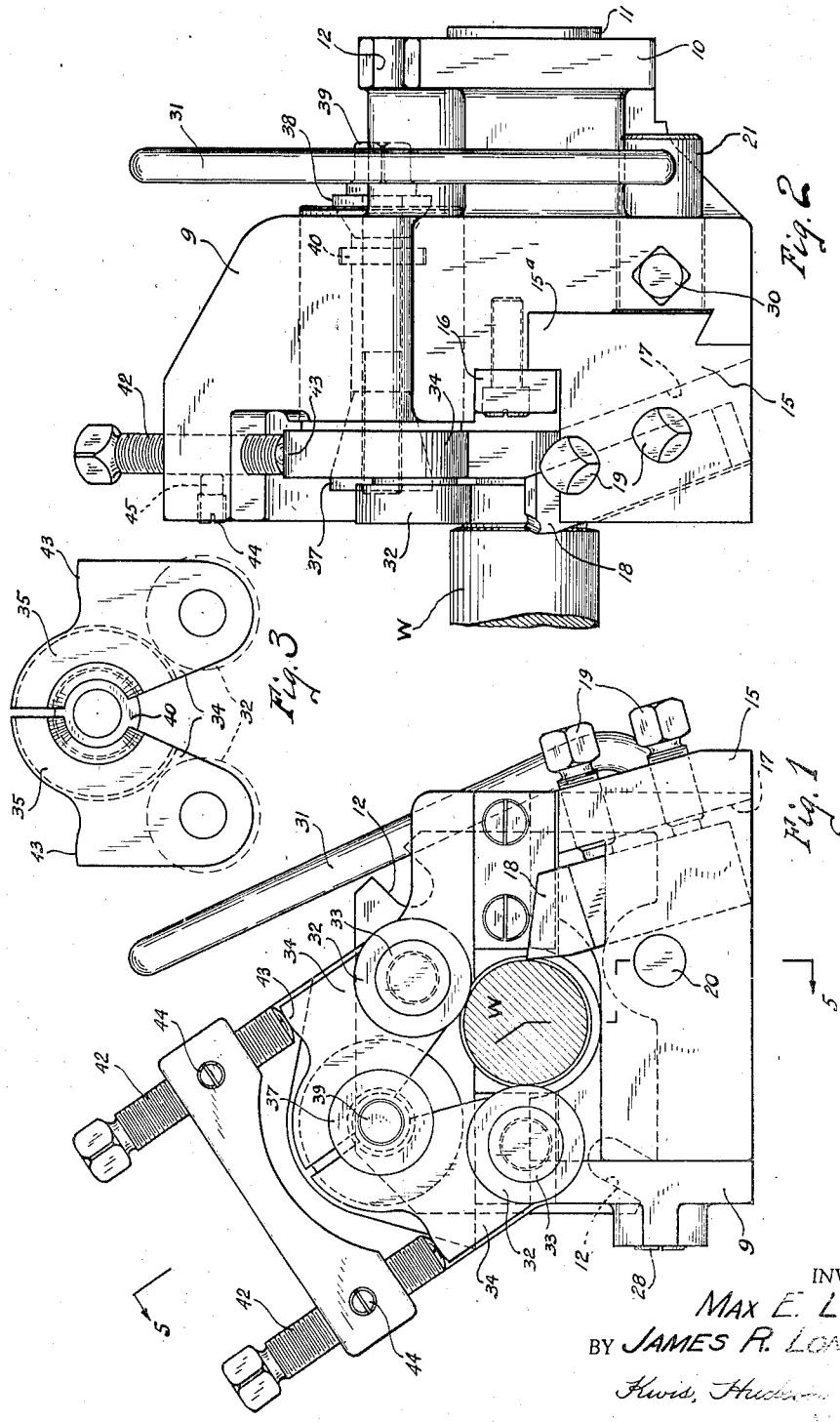

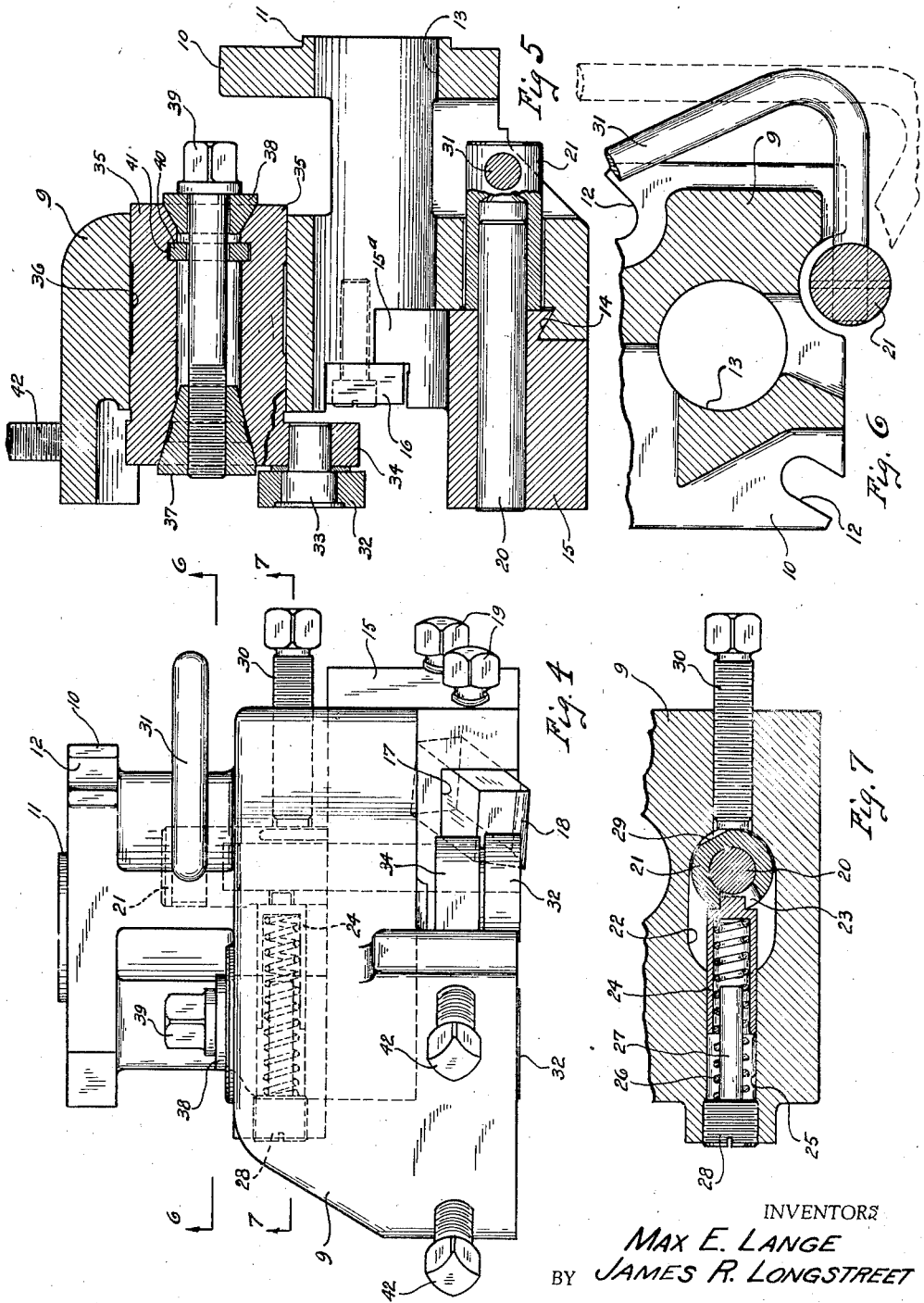

2,158,798

UNITED STATES PATENT OFFICE 2,158,798

TURNING TOOL FOR LATHES OR THE LIKE

Max E. Lange, Cleveland Heights, and James R. Longstreet, Bedford, Ohio, assignors to The Warner & Swasey Company, Cleveland, Ohio, a corporation of Ohio Application September 3, 1935, Serial No. 38,864
Renewed March 7, 1938

18 Claims. (Cl. 82—35)

This invention relates to a turning tool for lathes or the like.

One of the objects of the invention is to provide a turning tool for lathes or the like which is simple, strong and sturdy in construction, and which is compact and readily adjustable for different diameters of work.

Another object is to provide means for readily relieving the tool from the work piece after the cutting operation so that the tool can be retracted without leaving tool marks on the work piece, and for readily restoring the tool to cutting position.

Another object is to provide in a turning tool for lathes and the like thrust resisting members together with convenient accessible and readily operated means for positioning said members for varying diameters of work and for clamping and locking the said members in adjusted position.

A still further object is to provide in a turning tool for lathes and the like adjustable thrust resisting members together with a single means for clamping and locking said members in adjusted position for varying diameters of work.

Another object is to provide in a turning tool for lathes and the like improved means for positioning the tool in relationship to work of various diameters.

Further and additional objects and advantages not specifically referred to above will appear hereinafter during the detailed description which is to follow of an embodiment of the invention which is illustrated in the accompanying drawings, wherein Fig. 1 is a front elevational view of the turning tool with the work shown therein in section and the cutting tool in operative position with respect to the work.

Fig. 2 is a side elevational view of the turning tool looking from the right hand of Fig. 1.

Fig. 3 is a detached elevational view of the arms which carry the thrust resisting members, said members being shown in the view in dotted lines.

Fig. 4 is a top plan view of the turning tool shown in Figs. 1 and 2, the work piece being omitted.

Fig. 5 is a sectional view taken substantially on line 5—5 of Fig. 1 looking in the direction of the arrows, with the work piece omitted and one of the thrust resisting members also shown in section.

Fig. 6 is a fragmentary sectional view taken substantially on line 6—6 of Fig. 4 looking in the direction of the arrows, and Fig. 7 is a fragmentary sectional view taken substantially on line 7—7 of Fig. 4 looking in the the direction of the arrows.

The turning tool embodying the present invention is adapted to be used upon machine tools such as a lathe or the like, and it will be understood that when the tool is used upon a turret lathe, for example, it will be secured to one of the faces of the turret.

The tool comprises a tool holding body 9 which has at its rear end, that is the right hand end, as viewed in Figs. 2 and 5, a flange 10 which fits against the face of the turret of the lathe and is provided with a pilot portion 11 engaging in the opening in the face of the turret for the purpose of centering the tool on the turret. The flange 10 at diagonally opposite corners thereof is provided with reentrant slots 12 which receive the clamping bolts that secure the tool holding body 9 to the face of the turret.

The tool holding body 9 is provided with a centrally located opening 13 extending lengthwise therethrough and through which the finished portion of the work piece W passes. Below the opening 13 the body is provided with a V-shaped guideway 14 extending transversely of the opening 13 and which has a tool supporter slide 15 mounted thereon. Adjacent the front end of the body 9 there are a pair of transversely spaced guide strips 16 which engage with spaced upwardly projecting flanges 15a on the tool holding slide 15, wherefore it will be seen that the V-shaped guide-way 14, the flanges 15a and guide strips 16 form a suitable support for the slide 15 which allows the slide to be moved laterally the necessary distance for minimum and maximum diameters of work. The slide 15 is provided with a diagonally and downwardly extending opening 17 which receives the cutting tool 18, said tool after it has been properly located and positioned being held rigidly against the side of the opening 17 by means of clamping screws 19 (see Fig. 1), which extend from the outer side of the slide and engage a side edge of the cutting tool 18. It will be understood that the cutting tool 18 can be raised or lowered in the opening 17 to correctly position the tool with respect to the work piece W.

The slide 15 is provided with a pin 20 extending therethrough and into a bushing 21 which is rotatably mounted on the pin and is located in an elongated opening 22 in the body 9, so that said bushing can have sidewise movement in said opening when the slide 15 is being moved to move the cutting edge of the cutting tool 18 inwardly or outwardly for various diameters of work (see Fig. 7).

The bushing 21 is provided with an arcuate slot 23 into which extends a reduced portion of the closed end of a sleeve 24 that is slidably mounted in an opening 25 in the body and which is pressed normally inwardly by a spring 26 arranged in the sleeve 24 and surrounding a reduced portion 27 of a screw plug 28 against which said spring abuts. It will be apparent that the sleeve 24 and reduced portion thereof will always be urged toward the right, as viewed in Fig. 7, by the spring 26 and therefore the bushing 21, pin 20 and slide 15 will also be urged toward the right, for a purpose later to be explained, while the bushing 21 can be rocked through a short arc corresponding to the length of the slot 23.

Diametrically opposite to the slot 23 the bushing 21 is provided with a flat portion 29. As viewed in Fig. 7 the periphery of the bushing normally engages the reduced end of an adjusting screw 30 that extends into the body 9 and has its head readily accessible from the exterior of the body. A bent lever 31 has one of its ends extending through and secured in an opening formed in the closed solid end of the bushing 21, while its other end is located in a convenient position for the operator to use the same as a handle to rock the bushing to move the flat portion 29 thereof into or out of alignment with the reduced end of the adjusting screw 30.

It will be seen that when the adjusting screw 30 is turned inwardly or outwardly the position of the slide 15 will be altered, for the purpose of positioning the cutting tool 18 in the proper location for work pieces of different diameters, such movement of the slide not changing the relationship between the reduced end of the sleeve 24 and the arcuate slot 23 in the bushing, but merely moving the sleeve 24 against the constant pressure of the spring 26.

In Figs. 1 and 7 the position of the slide 15 and the bushing 21 is the proper one for having the cutting edge of the cutting tool in cutting position for work of a certain diameter, and it will be seen that when the lever 31 is rocked from the full line position shown in Fig. 6 to the dotted line position the flat portion 29 of the bushing 21 is brought into alignment with the reduced end of the adjusting screw 30, whereupon the spring 26, acting upon the sleeve 24, moves the bushing and the slide a slight distance to the right, as viewed in the drawings, to relieve the cutting edge of the cutting tool from the work, so that the tool will not score the work when the turret and turning tool are being moved to their rearward position.

In order to adequately take the thrust of the work during the cutting operation a plurality of rollers 32 are provided, in the present instance two such rollers being shown, and which, as will be well understood, engage with the periphery of the finished portion of the work, it being noted in Fig. 2 that the front edges of the rollers 32 are located slightly rearwardly of the cutting edge of the cutting tool 18. The rollers 32 are mounted on bearing pins 33 which are carried by the lower ends of arms 34 forming a part of thrust resisting members (see Fig. 5). The upper ends of said arms 34 of said members have integrally formed therewith complementary segmental sleeve portions 35, (see Figs. 3 and 5) which extend into a lengthwise opening 36 in the body 9 above and to one side of and parallel with the opening 13. The arms 34 of the thrust resisting members can be rocked toward or away from each other in order to position the rollers 32 with respect to work of different diameters. In order to lock the arms in the proper adjusted positions to which they have been rocked, the complementary segmental sleeve portions 35 of the thrust resisting members are expanded and locked in the opening 36 by means of a conical nut 37 engaging complementary conical surfaces formed at one end of the segmental sleeve portions. The opposite ends of the segmental sleeve portions are also provided with complemental conical surfaces which are engaged by a conical washer 38 through which extends a bolt 39 that screws into the nut 37, wherefore it will be seen that when the head of the bolt 39 is turned in the proper direction the nut 37 and washer 38 will be drawn relatively toward each other to effect a separation of the segmental sleeve portions to clamp the same in the opening 36 and, in turn, to clamp the thrust resisting members in position. Inasmuch as the expansion of the segmental portions in the opening 36 now appears to be the preferred way of clamping the thrust resisting members in position it has been so illustrated and described herein, but it will be understood that said portions might be clamped in the body in the reverse manner or in some other suitable way so long as the thrust resisting members are clamped sufficiently rigid to perform their function.

In order to provide for simultaneous and equal lateral shifting of the segmental sleeve portions of the thrust resisting members to position the front edges of the rollers correctly with respect to the cutting edge of the tool 18, a ring 40 loosely surrounds the bolt 39 and engages in complementary arcuate grooves 41 formed in the segmental sleeve portions, wherefore said portions must move endwise together.

After the rollers 32 have been adjusted for a work piece of a certain diameter, thrust screws 42 extending through a forwardly projecting part of the body 9 are brought into abutting engagement with shoulders 43 formed at the upper ends of the arms 34 for the purpose of resisting excessive thrust which might occur when heavy cuts are being taken in the work piece. The forwardly projecting portion of the body 9 which carries the thrust screws 42 also carries locking screws 44 which hold shoes 45 in engagement with the screws 42 to lock the same in position. It will be understood that the screws 19 and 30 may be locked against movement by vibration in a similar manner or by means of equivalent devices which are well known in the art.

In operation the work piece is positioned in the lathe and assuming the turning tool has been secured to a face of the turret, the cutting tool 18 is moved endwise to its proper position for cutting and then locked by the screws 19, after which the slide 15 is adjusted by means of the screw 30 to position the cutting edge of the cutting tool for the proper diameter of the work, at which time the lever 31 will be in the full line position shown in Fig. 6 and the reduced end of the screw 30 will be abutting the rounded periphery of the bushing 21 as shown in Fig. 7.

The lathe is now operated to cause the cutting tool 18 to cut the work piece to the required diameter and for a predetermined length. After this has been done the arms 34 of the thrust resisting members are rocked to bring the rollers 32 into thrust resisting engagement with the periphery of the finished portion of the work piece, whereupon the screw 39 is turned to clamp the segmental sleeve portions 35 in the opening 36 and then the thrust resisting screws are brought into abutting relation with the shoulders 43 of the arms 34 and locked in such position by the screws 44. When the cut has been completed upon the work piece and the turret is to move to its rearward position, the operator rocks the lever 31 from its full line position to its dotted line position, as shown in Fig. 6, to bring the flat portion 29 of the bushing 21 into registration with the screw 30, whereupon said bushing, slide 15 and cutting tool 18 are moved by the spring 26 and sleeve 24 a short distance to the right, as viewed in Fig. 1, to relieve the cutting tool from the finished surface of the work.

It will be understood that before a new work piece is cut in the turning tool the operator will move the lever 31 from the dotted line to the full line position of Fig. 6 to restore the cutting tool to cutting position.

It will be understood that the front edge of the rollers 32 must be slightly rearward of the cutting edge of the cutting tool 18, and if necessary the segmental sleeve portions 35 can be moved endwise in the opening 36 to effect this relationship. It will also be understood that in the disclosure of Fig. 7 the adjusting screw 30 is positioned for maximum diameter work pieces, and that where work pieces of smaller diameter than maximum are to be cut the bushing 21 on the pin 20 carried by the slide 15 can be moved by the screw 30 toward the left of the slot 22, as viewed in Fig. 7 to position the slide 15 in the proper location to bring the cutting edge of the cutting tool 18 into cutting position for a smaller diameter work piece than that shown in Fig. 1.

It will further be noted that the length of the slot 23 determines the amount of rocking movement which can be imparted to the bushing 21 by the lever 31 in order to bring the flat portion 29 in registration with the screw 30 when it is desired to relieve the cutting tool from the work.

It will be observed that the turning tool body is so constructed as to have all of the adjustable screws and the lever 31 in readily accessible locations, wherefore the operator can conveniently and quickly set up the tool and control the operation thereof.

Although a preferred embodiment of the invention has been shown and described it will be understood that the invention is susceptible of various modifications and adaptations within the scope of the appended claims.

Having thus described our invention we claim:

1. In a turning tool for lathes or the like, a body having an opening, a cutting tool, thrust resisting members having portions arranged in said opening, and means for spreading said portions in said opening to clamp said thrust resisting members and including conical surfaces on said portions, a conical washer and a conical nut cooperating with said surfaces and a screw for moving said nut and washer relatively towards or away from each other.

2. In a turning tool for lathes or the like, a body having an opening, a cutting tool, thrust resisting members having complementary segmental sleeve portions arranged in said opening and provided at their opposite ends with conical surfaces, and means for spreading said portions in said opening to clamp said thrust resisting members and including a conical nut and a conical washer cooperating with said conical surfaces and a screw for drawing said nut and washer together.

3. In a turning tool for lathes or the like, a body having an opening, a cutting tool, thrust resisting members having complementary segmental sleeve portions arranged in said opening and provided with complementary arcuate grooves, and a ring arranged between said sleeve portions and engaging in said grooves whereby said segmental portions if moved axially will move in unison.

4. In a turning tool for lathes or the like, a body carrying a cutting tool for movement parallel to the axis of a work piece, thrust resisting members mounted on said body and adjustable parallel to the axis of the work piece along a portion of the body at one side of the cutting tool, means for clamping said members in any desired position to which they may be thus adjusted, and a member interlocking with the thrust resisting members so as to cause them to move in unison while being adjusted.

5. In a turning tool for lathes or the like, a body having an opening, a cutting tool, thrust resisting members opposite said cutting tool and provided with complementary segmental portions arranged in said opening, and means for clamping said portions in said opening to clamp said thrust resisting members.

6. In a turning tool for lathes or the like, a body having an opening, a cutting tool, thrust resisting members opposite said cutting tool and including arm portions and complementary segmental portions integral with said arm portions and located in said opening, and means for clamping said segmental portions in said opening to clamp said thrust resisting members.

7. In a turning tool for lathes or the like, a body having an opening, a cutting tool, thrust resisting members opposite said cutting tool and including arm portions and complementary segmental portions integral with said arm portions and arranged in said opening, and means for effecting a relative movement between said segmental portions and the wall of the opening in said body to clamp said portions therein.

8. In a turning tool for lathes or the like, a body having an opening, a cutting tool, thrust resisting members opposite said cutting tool and including arm portions and complementary segmental portions connected with said arm portions and mounted in said opening, and means for clamping said segmental portions in said opening to clamp said thrust resisting members.

9. In a turning tool for lathes or the like, a body having an opening extending parallel to the axis of the work, a cutting tool, thrust resisting members opposite said cutting tool and including arm portions and complementary segmental portions connected to said arm portions and arranged in said opening and extending substantially the length thereof, and means for clamping said segmental portions in said opening.

10. In a turning tool for lathes or the like, a body having an opening, a cutting tool, thrust resisting members opposite said cutting tool and including complementary segmental sleeve portions arranged in said opening, means in said opening interconnecting said sleeve portions such that said portions if moved axially will move in unison, and means for clamping said portions in said opening.

11. In a turning tool for lathes or the like, a body having an opening, a cutting tool, thrust resisting members opposite said cutting tool and including elongated complementary segmental sleeve portions arranged in said opening, means located within the sleeve formed by said portions and interconnecting said portions such that said portions if moved axially will move in unison, and means for clamping said portions in said opening.

12. In a turning tool for lathes or the like, a body having an opening, a cutting tool, thrust resisting members opposite said cutting tool and having complementary segmental sleeve portions arranged in said opening, and means for clamping said segmental sleeve portions in said opening and including a member arranged within said sleeve portions.

13. In a turning tool for lathes or the like, a body having an opening, a cutting tool, thrust resisting members opposite said cutting tool and having complementary segmental sleeve portions arranged in said opening, and means for effecting a relative clamping movement between said sleeve portions and said body and including a single clamping bolt.

14. In a turning tool for lathes or the like, a body having an elongated opening therethrough, a cutting tool, thrust resisting members opposite said cutting tool and including arm portions and complementary portions connected to said arm portions and arranged in said opening and extending substantially the length thereof, and a single means for effecting radial clamping pressure between said body and said complementary portions.

15. In a turning tool for lathes or the like, a body having an opening extending parallel to the axis of the work, a cutting tool, thrust resisting members opposite said cutting tool and including arm portions and complementary portions connected to said arm portions and arranged in said opening and extending substantially the length thereof, and means for clamping said complementary portions in said opening.

16. In a turning tool for lathes or the like, a body having an opening extending parallel to the axis of the work, a cutting tool, thrust resisting members opposite said cutting tool and including arm portions located exteriorly of said body, and complementary portions connected to said arm portions and arranged in said opening for rocking movement therein, means interconnecting said complementary portions such that said portions if moved axially of said opening will move in unison, and means for clamping said complementary portions in said opening.

17. In a turning tool for lathes or the like, a body, a slide mounted thereon and carrying a cutting tool and including a rockable bushing having an arcuate slot in its periphery, a stop, means engaging said bushing and normally urging the same into engagement with said stop and including a portion extending into said slot for limiting the rocking movement of the bushing, and means for changing the relationship between said bushing and stop whereby said slide will have a further movement to relieve the tool and effective upon a rocking movement of the bushing.

18. In a turning tool for lathes or the like, a body, a slide mounted thereon and carrying a cutting tool and including a rockable bushing having an arcuate slot in its periphery, an adjustable stop for said bushing carried by said body, means engaging said bushing and normally urging the same into engagement with said stop and including a spring pressed plunger having a portion engaging in said slot to limit the rocking movement of the bushing, said bushing being provided on its periphery with stop abutting surfaces located at different radial distances from the axial center of said bushing, and means for rocking said bushing to bring one or another of said surfaces into registry with said stop to move said bushing and said slide.

MAX E. LANGE.
JAMES R. LONGSTREET.